I. RAMMINGER.
Detaching Horses.
No. 29,193. Patented July 17, 1860.
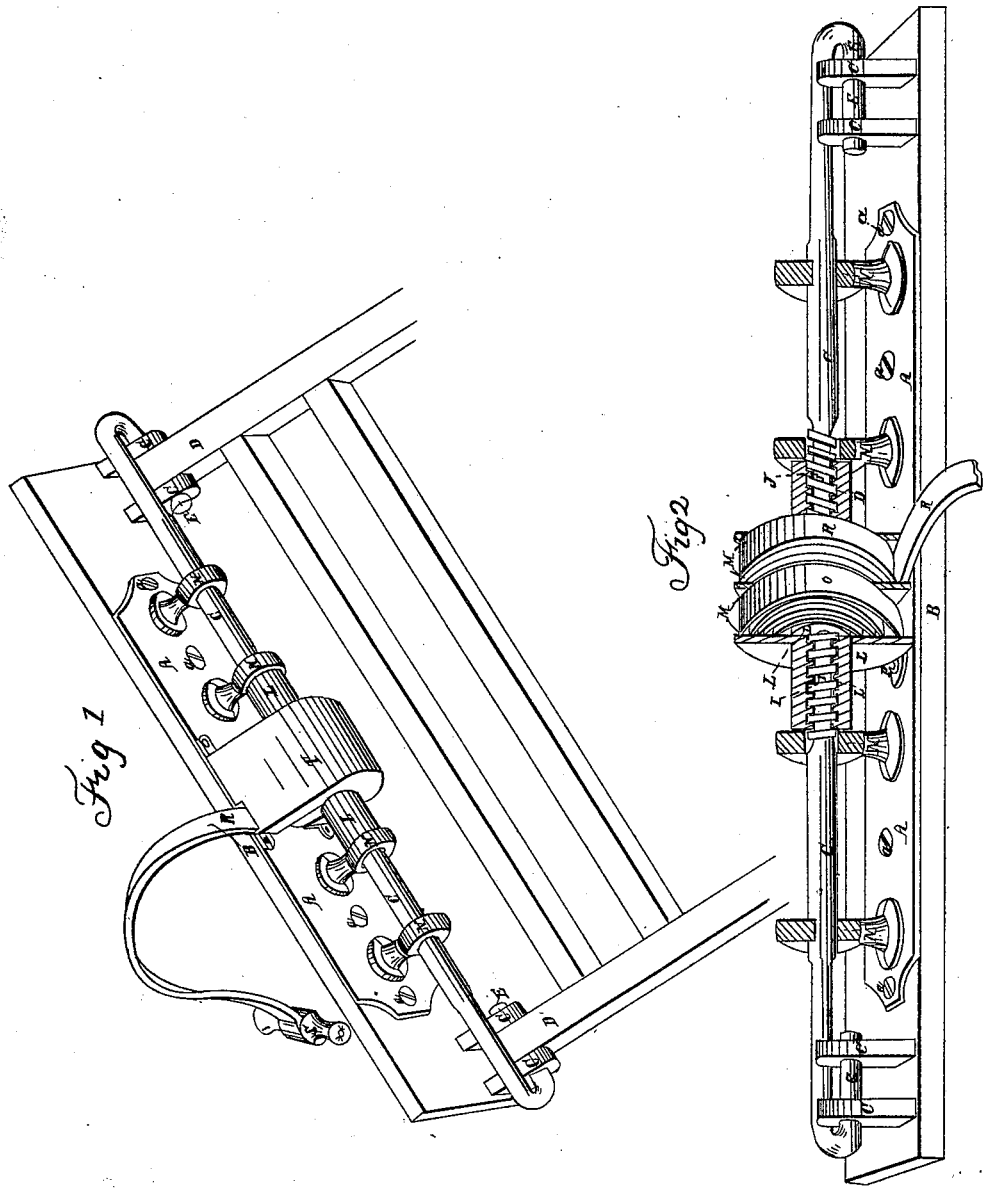
Witnesses.
Inventor.

UNITED STATES PATENT OFFICE.

IGNAZ RAMMINGER, OF NEW YORK, N. Y.

DETACHABLE WHIFFLETREE FOR VEHICLES.

Specification of Letters Patent No. 29,193, dated July 17, 1860.

*To all whom it may concern:*

Be it known that I, IGNAZ RAMMINGER, of New York, in the county and State of New York, have invented, made, and applied to use a new and Improved Apparatus for Disengaging Horses, When Running Away, From Vehicles; and I do declare the following to be a full, clear, and correct description of my said invention, reference being had to the accompanying drawings, and to the letters of reference marked thereon, in which—

Figure I, is a perspective view of the same, showing the shafts of the vehicle, held firmly in position by my apparatus. Fig. II, a sectional view of the same, the shafts not being shown.

In the drawings, like parts of the invention are designated by the same letters.

The nature of my invention consists in the construction and operation of an apparatus, as hereinafter specified, which is intended to be attached to the axle of a vehicle, and by the use of which, the horses when running away, may be detached from the vehicle, in a direct and expeditious manner.

It is unnecessary here to remark on the value of such an invention—the dangers and oftentimes, loss of life, resulting from the running away of horses attached to vehicles, are too well known to require further mention.

To enable others skilled in the art to make and use my invention, I will proceed to describe its construction and operation.

My improved apparatus is intended to be attached to the front axle (B) of a vehicle and consists of the plate (A) formed of brass or any suitable metal, attached to the axle (B) by means of screws (*a, a, a, a*) passing through the plate (A).

Upon the ends of the axle (B) are placed the standards (C, C) attached to the same by screws and slotted (*c, c*) for the reception of the shafts (D, D) of the vehicle. These standards (C, C) are provided with openings through which freely pass the bent ends (E E) of the rods (F, F), and which bent ends (E, E) passing through holes in the inserted ends of the shafts (D, D) serve as pins to hold the shafts (D, D) firmly in position or to release them from the axle (B) of the vehicle as hereinafter described.

Two rods (G, G), the outer ends (E, E) of which are bent, for the purpose just mentioned, extend almost the entire length of the axle (B) and their inner ends have cut upon them a right handed (I) and left handed (J) screw thread. These screw-threads (I and J) pass through or within the hub (L) which has corresponding threads cut on its interior. These rods (G, G) are supported by the standards (N, N) provided with openings, through which, they, the rods (G, G) pass.

The hub (L) is provided with two deep grooves (M, M′) around one of which (M) is coiled the spring (O), one end of which is attached to the plate of metal (A) by means of the screw (P), while the other end is fastened directly to the hub (L). Around the other groove (M′) is wound the strap (R) provided with the handle (S), and arranged in such a manner that by unwinding the strap (R), by which the hub (L) is turned, the two rods (G, G) provided with the right handed and left handed screws (I and J) will be thrown out, from the hub (L) and upon slackening which strap (R) the spring (O) contracts, giving a reverse motion to the hub (L) and causes the rods (G, G) to return to their position within the hub (L).

A box or cover (T) placed over the grooved portion of the hub (L) keeps the spring (O) and strap (R) in position.

The apparatus as previously stated is attached to the front axle (B) of the vehicle.

The strap (R) provided with the handle (S) and attached to the hub (L) is passed through a hole in the bottom of the vehicle, to the seat occupied by the driver or sufficiently near to him, to be within ready reach. The horses, starting to run away, and it being desirable to disengage them from the vehicle, the driver grasps the handle (S) of the strap (R) and pulls the same. As the strap (R) is unwound, the hub (L) revolves and throws out the rods (G, G) whose bent ends (E, E) form pins for the purpose of retaining the shafts (D, D): these, in turn, are thrown out, and the shafts readily drop out, from the slotted standards (C, C) into which they were inserted. By this means the horses are disengaged and allowed to run on, while the wagon or vehicle to which they were attached, remains under the control of the occupants.

I am fully aware that many methods of effecting the same object have been patented and are in use.

I do not know that any such apparatus as

I propose constructing, has ever been invented, prior to my invention of the same.

I claim as new and desire to secure by Letters Patent—

The use or employment of the rods (G, G) provided with the right handed (I) and left handed (J) screw-threads, in combination with the spring O, strap (R) provided with handle (S), hub (L) and axle (B), when the same shall be arranged and operated in the manner herein described and for the purpose as set forth.

Witness my hand, this 25th day of May, 1860.

IGNAZ RAMMINGER.

In presence of—
ALBERT WHEELER,
E. K. COOLEY.